United States Patent
Morelli et al.

(10) Patent No.: US 10,261,811 B2
(45) Date of Patent: Apr. 16, 2019

(54) SYSTEMS AND METHODS FOR CONTEXTUALLY ALLOCATING EMULATION RESOURCES

(71) Applicant: SPHERE 3D INC., Mississauga (CA)

(72) Inventors: Giovanni Morelli, Mississauga (CA); Brandon Cowen, Mississauga (CA); Marian Dan, Mississauga (CA)

(73) Assignee: SPHERE 3D INC., Mississauga (CA)

( * ) Notice: Subject to any disclaimer, the term of this patent is extended or adjusted under 35 U.S.C. 154(b) by 443 days.

(21) Appl. No.: 15/066,478

(22) Filed: Mar. 10, 2016

(65) Prior Publication Data

US 2016/0266916 A1 Sep. 15, 2016

Related U.S. Application Data

(60) Provisional application No. 62/130,889, filed on Mar. 10, 2015.

(51) Int. Cl.

| G06F 13/00 | (2006.01) |
| G06F 9/455 | (2018.01) |
| H04L 29/06 | (2006.01) |
| G06F 9/451 | (2018.01) |
| G06F 9/44  | (2018.01) |
| G06F 9/50  | (2006.01) |

(52) U.S. Cl.
CPC ............ *G06F 9/455* (2013.01); *G06F 9/4445* (2013.01); *G06F 9/452* (2018.02); *G06F 9/50* (2013.01); *H04L 67/42* (2013.01)

(58) Field of Classification Search
USPC ......... 703/2, 22, 26; 712/229, 209; 711/206; 717/127
See application file for complete search history.

(56) References Cited

U.S. PATENT DOCUMENTS

| 6,779,107 | B1* | 8/2004 | Yates ................... | G06F 9/45554 712/229 |
| 6,934,832 | B1* | 8/2005 | Van Dyke ........... | G06F 9/30174 712/244 |
| 6,941,545 | B1* | 9/2005 | Reese ................. | G06F 9/45554 711/206 |
| 6,954,924 | B2* | 10/2005 | Degenaro ............. | G06F 8/4442 717/127 |

(Continued)

*Primary Examiner* — Thai Q Phan
(74) *Attorney, Agent, or Firm* — Bereskin & Parr LLP/S.E.N.C.R.L., s.r.l.

(57) ABSTRACT

Systems and methods for contextually allocating emulation resources for providing an emulation session are disclosed. The method involves a plurality of emulation parameters including the computer product to be emulated, context data defining an emulation context, at least one kind of external resource usable to provide the emulation of the computer product. The method includes receiving an emulation request from a client device; determining a required class of service for providing the emulation based on the context data; determining a plurality of possible resource instances providable by the emulator system; selecting at least one selected resource instance from the plurality of possible resource instances to provide an operating instance of the at least one kind of external hardware resource for the emulation based at least in part on the required class of service; and providing the emulation to the client device using the at least one selected resource instance.

33 Claims, 3 Drawing Sheets

(56) References Cited

U.S. PATENT DOCUMENTS

| | | | | |
|---|---|---|---|---|
| 6,978,462 B1* | 12/2005 | Adler | ............... | G06F 9/30149 |
| | | | | 719/318 |
| 7,047,394 B1* | 5/2006 | Van Dyke | ........... | G06F 9/30167 |
| | | | | 703/26 |
| 7,111,290 B1* | 9/2006 | Yates, Jr. | ............ | G06F 9/45533 |
| | | | | 717/158 |
| 7,137,110 B1* | 11/2006 | Reese | ................ | G06F 9/45554 |
| | | | | 717/158 |
| 8,074,055 B1* | 12/2011 | Yates, Jr. | ............. | G06F 9/3005 |
| | | | | 712/209 |
| 8,121,828 B2* | 2/2012 | Yates, Jr. | ............ | G06F 9/45533 |
| | | | | 703/26 |
| 8,589,271 B2* | 11/2013 | Evans | .................. | G06Q 20/10 |
| | | | | 705/35 |
| 8,762,531 B1* | 6/2014 | Yemini | ................ | G06Q 10/06 |
| | | | | 709/226 |
| 9,674,275 B1* | 6/2017 | Engers | ............. | G06F 17/30126 |
| 9,852,011 B1* | 12/2017 | Yemini | ................ | G06F 9/5083 |
| 2004/0098391 A1* | 5/2004 | Robertson | ........... | G06F 17/5045 |
| 2005/0086650 A1* | 4/2005 | Yates, Jr. | ............ | G06F 9/45533 |
| | | | | 717/139 |
| 2008/0216073 A1* | 9/2008 | Yates | ................ | G06F 9/30174 |
| | | | | 718/100 |
| 2014/0074717 A1* | 3/2014 | Evans | .................. | G06Q 20/10 |
| | | | | 705/44 |
| 2016/0132883 A1* | 5/2016 | Evans | .................. | G06Q 20/10 |
| | | | | 705/44 |

* cited by examiner

SYSTEMS AND METHODS FOR CONTEXTUALLY ALLOCATING EMULATION RESOURCES

RELATED APPLICATIONS

This application claims priority from the U.S. patent application No. 62/130,889, filed Mar. 10, 2015 entitled "SYSTEMS AND METHODS FOR CONTEXTUALLY ALLOCATING EMULATION RESOURCES", the disclosure of which is incorporated herein, in its entirety, by reference.

FIELD

The described embodiments relate to systems and methods for contextually allocating emulation resources.

BACKGROUND

An emulator operates to imitate a computer product in an emulation session. The imitated computer product can be provided to a client device. The computer product can be a computer system, an operating environment, a software application, or one or more hardware and software components. The emulator system facilitates the emulation session by translating and processing instructions received from the client device into a format compatible with the emulated computer product.

The emulator system may be required to allocate emulation resources for an emulation session associated with an emulation request received from the client device. Allocating emulation resources based on an emulation context may improve operation of the emulator system.

SUMMARY

The embodiments described herein provide in one aspect a system and method for contextually allocating emulation resources for providing an emulation of a computer product. In some embodiments, the system can comprise a processor configured to receive an emulation request to provide the emulation at a client device. The emulation request can define the computer product to be emulated and one or more properties of the emulation. The processor can be further configured to determine an emulation context for the emulation based on at least one of client device data corresponding to the client device and user account data corresponding to a user associated with the client device. The processor can be further configured to select based on the emulation context one or more emulator servers for providing the emulation session.

In accordance with an embodiment, there is provided a method of providing an emulation of a computer product, the method including receiving an emulation request for the computer product from a client device and determining from the emulation request and the client device a plurality of emulation parameters, including the computer product to be emulated, context data defining an emulation context for the emulation, and at least one kind of external resource usable to provide the emulation of the computer product. The context data can include at least one of client device data, user account data, and emulator system data. Client device data can define resource characteristics of the client device. User account data can be associated with a user of the client device requesting the emulation. Emulator system data can define characteristics of an emulator system providing the emulation. The at least one kind of external resource includes at least one kind of external hardware resource usable to provide the emulation of the computer product. The at least one kind of external hardware resource is not providable by the client device and is providable by the emulator system. The method further includes determining a required class of service for providing the emulation based on the context data, the required class of service being one of a plurality of classes of service; determining a plurality of possible resource instances, each possible resource instance in the plurality of possible resource instances being individually providable by the emulator system to provide the at least one kind of external hardware resource; selecting at least one selected resource instance from the plurality of possible resource instances to provide an operating instance of the at least one kind of external hardware resource for the emulation based at least in part on the required class of service; and providing the emulation to the client device using the at least one selected resource instance.

In some embodiments, the determining the required class of service involves determining a plurality of potential classes of service for providing the emulation from the at least one of the client device data, the user account data, and the emulator system data; providing a cost function for determining an associated cost, for each potential class of service in the plurality of potential classes of service; and using the cost function, determining a lowest cost class of service in the plurality of potential classes of service as the required class of service. The plurality of classes of service includes the plurality of potential classes of service.

In some embodiments, the at least one of client device data, user account data and emulator system data includes the client device data. The client device data includes at least one of client resource data and client operational data. The client resource data can define kinds of hardware resources providable by the client device and the client operational data can define usage of the kinds of hardware resources providable by the client device other than for the emulation. The determining the required class of service can involve determining client device performance requirements from the client device data; and determining the required class of service based, at least in part, on the client device performance requirements. The client device performance requirements can define a level of performance that is perceivable by the user of the client device.

In some embodiments, the at least one of client device data, user account data and emulator system data includes the user account data. The user account data includes at least one of service subscription data, product subscription data, and historic usage data. Service subscription data can define a subscribed class of service required for emulation requests from the user. Product subscription data can define a subscribed class of service required for emulation requests for a particular computer product from the user. Historic usage data can define usage of past emulations provided for the user. The determining the required class of service can involve determining a user expected class of service for the user based on the user account data; and determining the required class of service based, at least in part, on the user expected class of service. The user expected class of service can define a level of performance the user is expected to require for the emulation.

In some embodiments, the at least one of client device data, user account data and emulator system data includes the emulator system data. The emulator system data includes at least one of historic global usage data and current global usage data. The historic global usage data can define usage of the at least one kind of external resource for past emulations provided by the emulator system including past emulations provided to the user and past emulations provided to other users. The current global usage data can define current usage of the at least one kind of external resource other than for the emulation. The determining the required class of service can involve determining a system expected class of service for the emulation based on the emulator system data and determining the required class of service based, at least in part, on the system expected class of service. The system expected class of service can define a level of performance expected to be required from the emulator system for the emulation.

In some embodiments, the method can further include for each of the at least one kind of external hardware resource, determining, for each possible resource instance, at least one associated resource class designation, identifying at least one potential resource instance from amongst the plurality of possible resource instances; and selecting the at least one selected resource instance for providing the emulation from amongst the at least one potential resource instance. Each associated resource class designation in the at least one associated resource class designation can define a class of service providable by that possible resource instance. Each possible resource instance in the plurality of resource instances can be identified as one of the at least one potential resource instance if and only if resource class designation corresponding to that particular possible resource instance is not less than the required class of service for providing the emulation.

In some embodiments, for each kind of external hardware resource, the resource class designation for each possible resource instance in the plurality of possible resource instances of that kind can be defined by a static resource class designation for that possible resource instance. The static resource class designation can be determined based at least in part on defined performance specifications of that possible resource instance for that kind of external hardware resource.

In some embodiments, for each kind of external hardware resource, the resource class designation for each possible resource instance in the plurality of possible resource instances of that kind can be defined by a dynamic resource class designation for that resource instance. The dynamic resource class designation can be determined based at least in part on a resource operational characteristic and defined performance specifications of that possible resource instance for that kind of external hardware resource. The resource operational characteristic can define usage of that possible resource instance other than for the emulation.

In some embodiments, for at least one kind of external hardware resource, the at least one potential resource instance includes a plurality of potential resource instances. The selecting the at least one selected resource instance for providing the emulation includes providing a resource performance function usable to determine a relative performance indicator for each potential resource instance in the plurality of potential resource instances; using the resource performance function to determine at least one highest ranking potential resource instance from the plurality of potential resource instances identified for that kind of external hardware resource; and determining the at least one highest ranking potential resource instance as the at least one selected resource instance. The relative performance indicator for each potential resource instance can define performance of that potential resource instance.

In some embodiments, the emulator system includes a plurality of emulator servers, each emulator server capable of providing at least one particular kind of external resource in the at least one kind of external resource usable to provide the emulation. The method can further include determining for each emulator server an associated server class designation defining at least one class of service providable by that emulator server; and selecting the at least one selected resource instance. The associated server class designation can be determined based at least in part on server specific resource instances providable by that emulator server. The selecting the at least one selected resource instance can involve identifying at least one potential resource instance from the plurality of possible resource instances and selecting the at least one selected resource instance from amongst the at least one potential resource instance. The identifying at least one potential resource instance from the plurality of possible resource instances can include identifying a plurality of potential emulator servers from the plurality of emulator servers, selecting at least one selected emulator server from amongst the plurality of potential emulator server; identifying the server specific resource instances providable by each selected emulator server of the at least one selected emulator server, each server specific resource instance corresponding to one of the possible resource instances; and identifying the at least one potential resource instance from amongst the server specific resource instances. An emulator server can be identified as a potential emulator server if and only if the server class designation corresponding to that emulator server is within a threshold service level of the required class of service for providing the emulation.

In some embodiments, for each emulator server, the server class designation includes a static server class designation for that emulator server. The static server class designation can define a highest class of service providable by that emulation server. The static server class designation can be determined based at least in part on defined performance specifications of that emulator server and the server specific resource instances providable by that emulator server. The identifying at least one potential emulator server can be based on the static server class designation.

In some embodiments, for each emulator server, the server class designation includes a dynamic server class designation for that emulator server. The dynamic server class designation can be determined based at least in part on a server operational characteristic and the defined performance specifications of that emulator server. The server operational characteristic can define usage of that emulator server other than for the emulation including usage of the server specific resource instances providable by that emulator server. The identifying at least one potential emulator server can be based on the dynamic server class designation.

In some embodiments, a particular emulator server of the plurality of potential emulator server is initially providing a second emulation at a second client device. The method can involve that particular emulator server being identified as one of the plurality of potential emulator servers by identifying current usage of that particular emulator server to provide the second emulation at the second client device; determining an initial server performance indicator and a transitional server performance indicator; and identifying the particular emulator server as a particular potential emulator server in the plurality of potential emulator servers based on the transition performance indicator being within a transition performance threshold of the initial server performance indicator. The initial server performance indicator can define a performance of the second emulation being provided by that particular emulator server. The transitional server performance indicator can define an expected performance of the second emulation being provided by a second particular emulator server of the plurality of emulator servers.

In some embodiments, the selecting at least one selected emulator server from amongst the plurality of potential emulator servers involves providing a server performance function usable to determine a relative server performance indicator for each potential emulator server in the plurality of potential emulator servers, and using the server performance function, determining at least one highest ranking potential emulator server as the at least one selected emulator server. The relative server performance indicator can define performance of that emulator server.

In some embodiments, the server performance function is usable to determine the relative server performance indicator for each potential emulator server in the plurality of potential emulator servers based, at least in part, on an expected performance providable by that potential emulator server, the expected performance being determined based on current usage of that potential emulator server including usage of the server-specific resource instances providable by that potential emulator server.

In some embodiments, subsequent to the providing the emulation to the client device using the at least one selected resource instance, the method further includes determining at least one potential alternative class of service for providing the emulation to the client device, each potential alternative class of service being a different one of the plurality of potential classes of service; providing a cost function for determining an associated cost, for each of the required class of service and the at least one potential alternative class of service; using the cost function, determining an updated lowest cost class of service from the required class of service and the at least one potential alternative class of service; determining an updated required class of service for providing the emulation as the updated lowest cost class of service; selecting at least one updated selected resource instance for providing the emulation based at least in part on the updated required class of service; and transitioning the emulation to be provided using the at least one updated selected resource instance. The at least one updated selected resource instance can include at least one particular updated selected resource instance that is different from a particular selected resource instance of the at least one selected resource instance. The associated cost for each of the required class of service and the at least one potential alternative class of service can be determined using at least one of historic global usage data, current global usage data and current emulation usage data. The current emulation usage data can define usage of the emulation at the client device. The historic global usage data can define usage of the at least one kind of external resource for past emulations provided by the emulator system including past emulations provided to the user and past emulations provided to other users. The current global usage data can define current usage of the at least one kind of external resource other than for the emulation.

DETAILED DESCRIPTION OF DRAWINGS

Several embodiments of the present invention will now be described in detail with reference to the drawings, in which.

Figure 1:
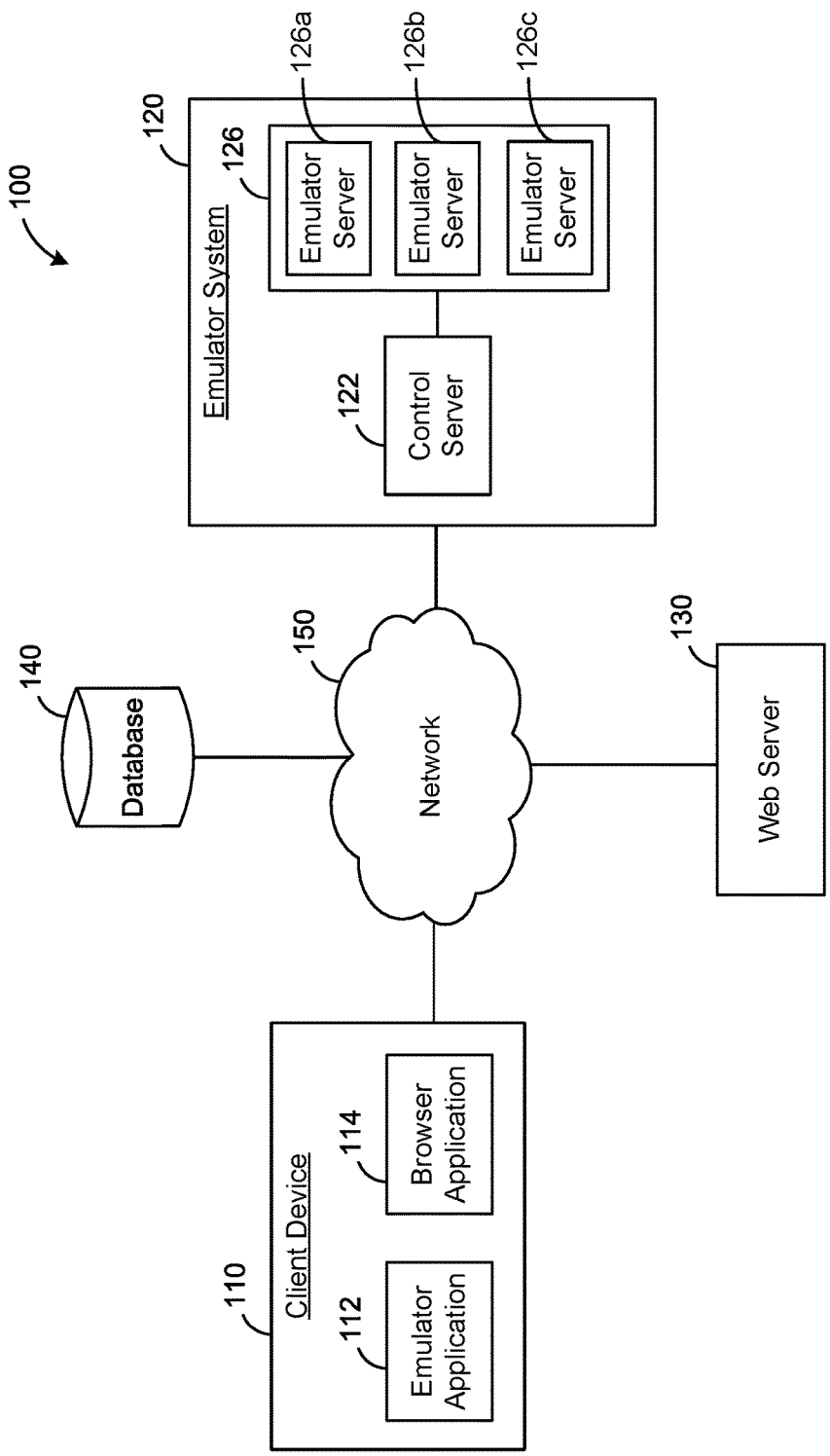
FIG. 1 is a block diagram illustrating an emulator system in communication with other components, in accordance with an example embodiment.

The drawings, described below, are provided for purposes of illustration, and not of limitation, of the aspects and features of various examples of embodiments described herein. The drawings are not intended to limit the scope of the teachings in any way. For simplicity and clarity of illustration, elements shown in the figures have not necessarily been drawn to scale. The dimensions of some of the elements may be exaggerated relative to other elements for clarity. It will be appreciated that for simplicity and clarity of illustration, where considered appropriate, reference numerals may be repeated among the figures to indicate corresponding or analogous elements or steps.

DETAILED DESCRIPTION OF EXEMPLARY EMBODIMENTS

The embodiments of the systems, processes, and methods described herein may be implemented in hardware or software, or a combination of both. Alternatively, these embodiments may also be implemented in computer programs executed on programmable computers each comprising at least one processor (e.g., a microprocessor), a data storage system (including volatile and non-volatile memory or storage elements), at least one input device, and at least one output device. For example and without limitation, the programmable computers (referred to below as computing devices) may be a personal computer, laptop, personal data assistant, cellular telephone, smart-phone device, tablet computer, or wireless device. For any software components, program code is applied to input data to perform the functions described herein and generate output information. The output information is applied to one or more output devices, in known fashion.

Each software component or program may be implemented in a high level procedural or object oriented programming or scripting language to communicate with a computer system. However, the programs can be implemented in assembly or machine language, if desired. In any case, the language may be a compiled or interpreted language. Each such computer program is preferably stored on a storage media or a device (e.g., ROM (read-only memory)) readable by a general or special purpose programmable computer, for configuring and operating the computer when the storage media or device is read by the computer to perform the procedures described herein. The subject system may also be considered to be implemented as a computer-readable storage medium, configured with a computer program, where the storage medium so configured causes a computer to operate in a specific and predefined manner to perform the functions described herein.

Furthermore, the processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, this description and the drawings are not to be considered as limiting the scope of the embodiments described herein in any way, but rather as merely describing the implementation of the various embodiments described herein.

The various embodiments described herein generally relate to a system and related methods for contextually allocating emulation resources.

FIG. 1

Reference is first made to FIG. 1, which illustrates a block diagram 100 of an emulator system 120 in communication with other components in accordance with an example embodiment.

As shown in FIG. 1, emulator system 120 may communicate with a client device 110, a web server 130, and a database 140 over a network 150. Similarly, each of client device 110, web server 130, and database 140 may also communicate with each other over network 150. The network 150 may include, for example, a mobile network, the internet, or a virtual emulator network.

Client Device 110

Client device 110 may generally be any computing device capable of network communication. It will be understood that, for ease of exposition, only one client device 110 is illustrated, but two or more client devices may be used. Client device 110 can include a processing component and a memory component. For example client device 110 may be a personal computer, laptop, personal data assistant, cellular telephone, smart-phone device, tablet computer, wireless device, etc.

Client device 110 can include software and hardware resources. For example, as illustrated in FIG. 1, the software resources may include an emulator application 112 and a browser application 114. Browser application 114 may be executed on client device 110 for providing a browser with which a user may access the network 150.

Emulator application 112 can enable compatibility between client device 110 and emulator system 120. For example, the emulator application 112 may enable client device 110 to properly interface with any software and hardware components that may be provided at emulator system 120. Emulator application 112 may further collect information regarding the resources of client device 110. For example, emulator application 112 may record client resource identifiers defining the software and hardware resources available at client device 110, and provide the client resource identifiers to database 140 for storage.

Emulator application 112 may further track operational characteristics of client device 110. Client operational characteristics may include, for example, operational capabilities, parameters, status, availability, capacity, operational load, computational efficiency, computational performance, network throughput, bandwidth availability, and other similar factors corresponding to the operational characteristics of client device 110 or any of its resources. Emulator application 112 may forward client device data defining client operational characteristics to emulator system 120 for processing, or database 140 for storage.

The hardware resources provided on client device 110 may include any known hardware resources for operating client device 110. For example, the hardware resources may include an interface module for receiving and transmitting data (e.g., a USB (universal serial bus) port, one or more peripheral ports, etc.), a processor module (e.g., a CPU (central processing unit)), a storage module (e.g., RAM (random access memory)), a navigation module (e.g., a GPS (global positioning system)), a multimedia module (e.g., a sound card, a video card, etc.), a communication module for providing communication with external components or devices (e.g., via radio-frequency, wireless, Bluetooth™ communication, etc.), one or more user interface components (e.g., a touch screen, a keyboard, a display, etc.), or other modules for providing additional features (e.g., a gyroscope, etc.).

It will be understood that other software or hardware resources may be provided on client device 110.

Database 140

Database 140 is provided to store and provide various data information associated with any of client device 110, users associated with client device 110, web server 130, and emulator system 120. For example, database 140 can store information associated with certain computer products to be emulated, such as required-resource data defining the software and hardware resources required for emulating each of the computer products. Database 140 may also store client device data and emulator server data defining the resources and operational characteristics of client device 110 and emulator system 120, respectively; authentication data for identifying and authenticating users or client devices; user account data defining a user's access privileges or service subscriptions for emulator system 120, user preferences with respect to emulations provided by emulator system 120, history of usage of emulator system 120, etc.

Database 140 may be accessible over the network 150 by any of client device 110, web server 130, and emulator system 120. It will be appreciated that in some embodiments, database 140 may be provided as part of emulator system 120. It will further be appreciated that other databases may be provided in addition to, or in lieu of, database 140. For example, in some embodiments, control server 122 may include a control server database that can provide the same or similar functionality as database 140.

Web Server 130

Web server 130 can generally be used to host a website or one or more webpages that act as a portal to emulator system 120. It will be appreciated that in some embodiments, web server 130 may be provided as part of emulator system 120. For example, control server 122 may include web server 130, and therefore, also host the website.

The website may include one or more user interfaces for registering users and receiving requests for initiating an emulation session at emulator system 120. For example, client device 110 may display the website using browser application 114, and web server 130 providing the displayed website may receive registration data, subscription data, request data, etc. from client device 110 via the website. User requests for initiating an emulation session may be referred to as emulation requests. Emulation requests may include client data for identifying and authenticating client device 110 or one or more users associated with client device 110.

Web server 130 may forward emulation requests received to emulator system 120 for initiating a corresponding emulation session. In response to receiving an emulation request, emulator system 120 may implement the emulation request.

Emulator System 120

Emulator system 120 may include one or more components for providing an emulation of a computer product based on the emulation request received from client device 110. The components may include an emulation control server 122 and one or more emulator servers 126.

Although emulator system 120 is shown to include multiple emulator servers 126a, 126b, and 126c, in some embodiments, emulator system 120 may include more or fewer emulator servers 126. For example, emulator system 120 may include one, two, four, five, or more emulator servers 126. Further, although control server 122 and emulator servers 126 are shown as separate computer servers, it will be understood that in some embodiments, control server 122 and one or more emulator servers 126 may be provided as one computer server. It will be further understood that any one of control server 122 and each emulator server 126 may be provided as two or more computer servers.

Control server 122 and each emulator server 126 can include a processing component and a memory component. For example, control server 122 may include a control processor and each emulator server 126 may include a respective emulator processor. It will be understood that in some embodiments, the control processor and an emulator processor may be provided as the same processor. In other embodiments, the control processor or an emulator processor may be provided as two or more processors.

Control server 122 can generally operate to create one or more emulation sessions in response to receiving an emulation request, determine an emulation context for the emulation session, select one or more emulator servers for providing the emulation session based on the emulation context, and initiate, track, and manage, each created session based on a session identifier.

Emulator servers 126 can generally operate to provide an emulation of a computer product based on the emulation request received from client device 110. To do so, emulator servers 126 may provide or make available one or more operating instances of each kind of hardware or software resources usable for providing an emulation session.

In the description that follows, an operating instance of a kind of hardware resource, or external hardware resource, providable by an emulator server may be referred to as a hardware resource, or an external hardware resource, providable by the emulator server; however, it is understood that the emulator server provides an operating instance of the hardware resource, or the external hardware resource.

FIG. 2

Figure 2:
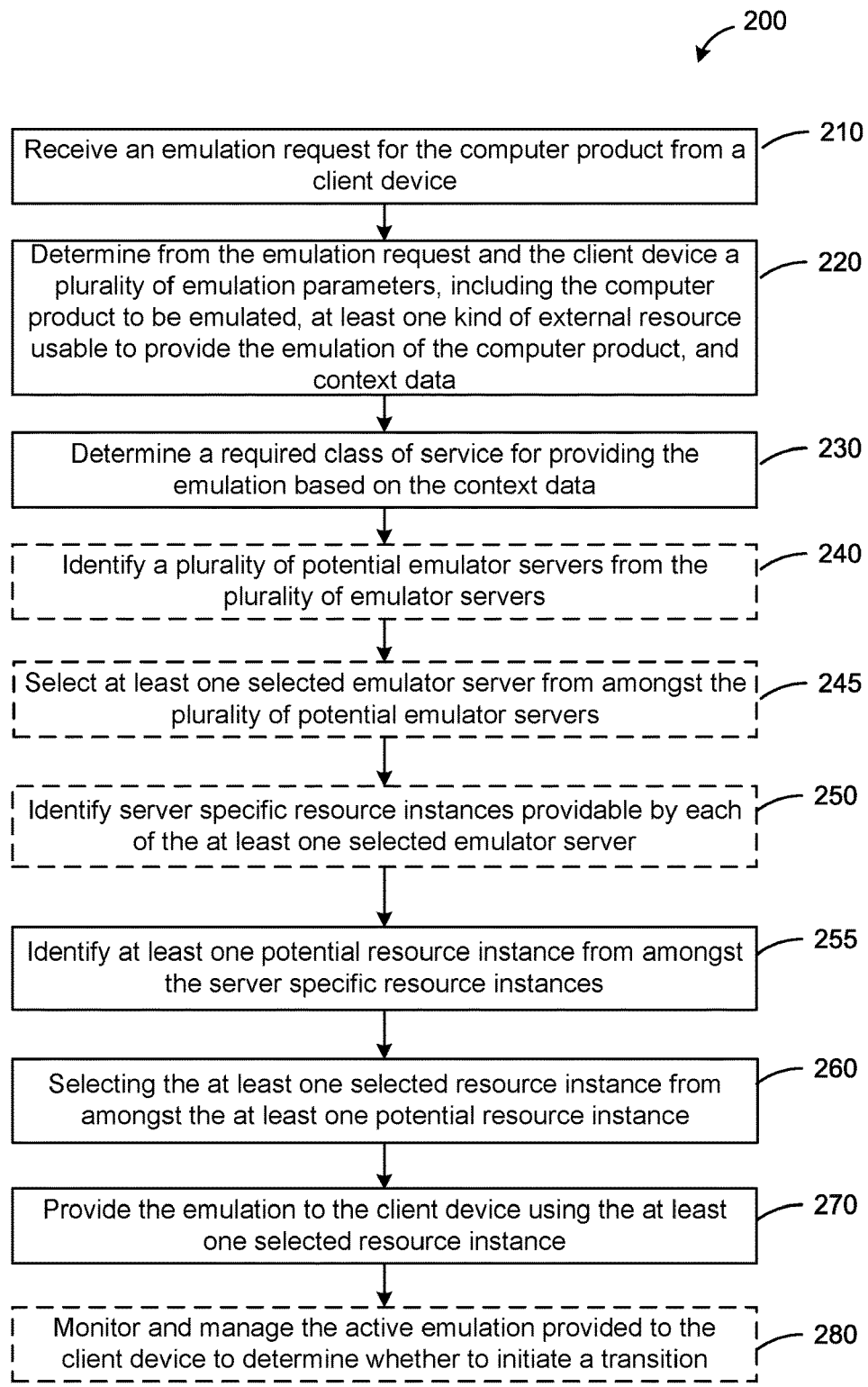
FIG. 2 is a flowchart illustrating a process for providing the emulation, in accordance with an example embodiment.

Reference is now made to FIG. 2, which is a flowchart illustrating an example process 200 for providing client device 110 with an emulation of a requested computer product in accordance with an example embodiment.

Step 210

At step 210, control server 122 receives an emulation request from client device 110. The emulation request may include user data for identifying and authenticating a user requesting the emulation, or a user associated with client device 110. The emulation request may include client data for identifying and authenticating client device 110. The emulation request can further include emulation data indicating aspects of the emulation being requested by the user. The emulation data may define at least one of a computer product to be emulated and one or more properties of the emulation. The emulation request may include metadata, from which the user data, client device data, and emulation data may be determinable.

In response to receiving the emulation request, control server 122 can operate to create an emulation session for that emulation request. Control server 122 may create the emulation session based on the emulation data corresponding to the emulation request.

When the emulation session is created, control server 122 may also create an emulation session identifier for that emulation session. Control server 122 can associate the session identifier with that emulation session. The session identifier may be unique to the emulation session being provided for client device 110. The session identifier may be stored in database 140.

Step 220

At step 220, control server 122 can determine a plurality of emulation parameters from the emulation request and the client device 110. The plurality of emulation parameters can include the emulation being requested by client device 110, at least one kind of external resource usable for providing the requested emulation, and the context data. The at least one kind of external resource usable for providing the requested emulation can include one or more hardware and software resources. In some embodiments, database 140 may include data defining the at least one kind of external hardware resource usable for implementing different emulations. Control server 122 may therefore determine from database 140 the at least one kind of external hardware resource usable for providing the requested emulation.

Control server 122 can then operate to link the at least one kind of external hardware resource with the emulation session identifier. For example, control server 122 may link an identifier for each of the at least one kind of external hardware resource with the emulation session identifier by storing the external hardware resource identifiers in association with the emulation session identifier in database 140.

Step 230

At step 230, control server 122 can determine an emulation context for the emulation session created at step 210. Control server 122 may determine the emulation context based on context data. Context data may include, or may be based on, for example, the emulator system data, client device data, user account data, etc. It will be understood that control server 122 may retrieve context data from database 140, or may receive such data from client device 110 or as part of the emulation request. Control server 122 may parse or process the context data based on a context determination protocol stored in database 140 to determine the emulation context for the emulation session. In some embodiments, the context determination protocol may specify the context data to consider and the procedure to follow to determine the emulation context.

Class of Service

In some embodiments, the context determination protocol may provide instructions for control server 122 to determine the emulation context based on a class of service to be provided for the emulation session. The class of service may define a level of performance, quality of service, or priority level to be provided for the emulation session. For example, the class of service may be selected from one of class 1 service, class 2 service, and class 3 service. It will be understood that the class of service may be selected from more or fewer than three classes of service.

In some embodiments, class 1 service may define a maximum level of performance, quality, or priority for the emulation session, and may be provided to, for example, high-priority users such as users having system administrator credentials. Class 2 service may define a standard level of performance, quality, or priority for the emulation session. Class 3 service may define a minimally acceptable level of performance or quality for the emulation session. For example, class 1 service may involve prioritizing the allocation of available resources, or the highest-performance resources, of emulator system 120 to the emulation session, to provide a maximum level of performance and quality. In contrast, class 3 service may involve allocating a minimal amount of resources of emulator system 120 to meet only minimally acceptable performance and quality requirements. For example, class 3 service may involve allocating the lowest-performance resources, or only those resources that have not been allocated to other emulations sessions of class 1 or class 2 service. The performance and quality of a resource may be based on one or more of its operational characteristics such as, for example, its response time, processing speed, operational capacity, efficiency, reliability, etc.

User Account Data

In some embodiments, the context determination protocol may provide instructions for control server 122 to determine a user expected class of service to be provided based on user account data. The user expected class of service can define a level of performance the user is expected to require for the emulation. In this case, control server 122 may process client data provided as part of the emulation request to identify the user requesting the emulation. Control server 122 may then retrieve from database 140 user account data associated with the identified user.

Service Subscription Data

In some embodiments, user account data may include service subscription data. Service subscription data may indicate the class of service to which the user requesting the emulation is subscribed. In some embodiments, the user may have permission to request emulator system 120 to provide an emulation of one or more computer products. In this case, the service subscription data may indicate a respective class of service for each computer product the user has permission to request. Control server 122 may therefore determine the emulation context for the emulation session by retrieving and processing the service subscription data of the user account to identify the user expected class of service to be provided for the current emulation session. For example, if the service subscription data indicates the user is a system administrator, or a high-priority user subscribed to class 1 service for the computer product to be emulated, then control server 122 may determine that the emulation context for the emulation session should be set to class 1 service.

Historic Usage Data

In some embodiments, the user account data may include historic usage data. Historic usage data may indicate the historic usage of emulator system 120 by the user requesting the emulation. Control server 122 may therefore determine the emulation context for the emulation session by retrieving and processing the historic usage data corresponding to the user account, to identify an appropriate class of service for the current emulation session.

For example, control server 122 may process the historic usage data to determine the minimum, average, or maximum utilization of resources by the user during past emulation sessions that provided an emulation of the computer product currently being requested. The utilization of resources can correspond to, for example, the minimum, average, or maximum amount of processing power or RAM of emulator system 120 utilized during previous emulation sessions.

Control server 122 may, for example, determine based on the historic usage data, that the user, on average, utilizes a high amount of processing power during emulation sessions for the requested computer product. In this case, to ensure the user is provided with sufficient resources for the current emulation session, control server 122 may determine that the appropriate user expected class of service for the emulation session is class 1 service. On the other hand, control server 122 may determine based on the historic usage data that the user, on average, utilizes a low amount of processing power during emulation sessions for the requested computer product. In this case, to optimize resource allocation, control server 122 may determine that the appropriate user expected class of service for the emulation session is class 3 service.

In some embodiments, the emulation request may correspond to a computer product the user is requesting for the first time. The user account data of the user may therefore not contain historic usage data for that particular computer product. In this case, control server 122 may parse the user's historic usage data to determine whether historic usage data exists for computer products similar to the requested computer product. If so, control server 122 may process the existing historic usage data to estimate an appropriate user expected class of service for the requested computer product.

For example, the user may request emulator system 120 to provide client device 110 with an emulation of a specific 3D animation application. If this is the first time the user is requesting an emulation of the specific 3D animation application, then control server 122 may parse the user's historic usage data to determine whether the user has previously been provided with emulations for other types of 3D animation applications. If so, then control server 122 may estimate an appropriate user expected class of service for the requested 3D animation application based on historic usage data associated with the other types of 3D animation applications.

Emulator System Data

In some embodiments, the context determination protocol may provide instructions for control server 122 to determine a system expected class of service to be provided based on emulator system data. The system expected class of service can define a level of performance expected to be required from the emulator system for the emulation. In this case, control server 122 may process emulator system data provided as part of the emulation request. Alternatively, or in addition, the emulator system data may be stored in and retrieved from database 140.

In some embodiments, emulator system data may include historic global usage data. Historic global usage data may indicate the historic usage of a computer product by all users of the emulator system 120 during all past emulation sessions that provided an emulation of the computer product. Control server 122 may process the historic global usage data to determine the minimum, average, or maximum utilization of resources by any user during all past emulation sessions that provided an emulation of the computer product currently being requested. The utilization of resources can correspond to, for example, the minimum, average, or maximum amount of processing power or RAM of emulator system 120 utilized during previous emulation sessions.

Control server 122 may, for example, determine based on the historic global usage data, that users, on average, utilize a high amount of processing power during emulation sessions for the requested computer product. In this case, to ensure the user is provided with sufficient resources for the current emulation session, control server 122 may determine that an appropriate system expected class of service for the emulation session is class 1 service. On the other hand, control server 122 may determine based on the historic global usage data, that users, on average, utilize a low amount of processing power during emulation sessions for the requested computer product. In this case, to optimize resource allocation, control server 122 may determine that an appropriate system expected class of service for the emulation session is class 3 service.

In some embodiments, control server 122 may estimate an appropriate system expected class of service for the emulation session based on the historic global usage data associated with other users of emulator system 120. For example, database 140 may store historic global usage data indicating the historic usage across all user accounts for each computer product emulator system 120 is capable of providing to client device 110. The historic global usage data may indicate, for each computer product, the minimum, average, or maximum utilization across all user accounts of each type, or kind of resource usable for emulating that computer product.

In some embodiments, the historic global usage data may further indicate times of day during which emulator system 120 or particular emulator servers 126 experience a high demand. For example, the historic global usage data may indicate that there is a disproportionately high number of users requesting class 1 service from Monday to Friday between 10:00 am and 5:00 pm. Control server 122 may therefore estimate an appropriate system expected class of service for the emulation session based on the historic global usage data.

In some embodiments, emulator system data may include current global usage data. Current global usage data may indicate the current usage of a computer product by all users of the emulator system 120 during all current emulation sessions providing an emulation of the computer product.

Client Device Data

In some embodiments, the context determination protocol may provide instructions for control server 122 to determine client device performance requirements based on client device data. The client device performance requirements can define a level of performance that is perceivable by the user of the client device. In this case, control server 122 may process client data provided as part of the emulation request to identify client device 110. Control server 122 may then request client device 110 to provide client resource identifiers defining the resources available at client device 110, and client operational data indicating the operational characteristics associated with client device 110 and its resources. Alternatively, or in addition, the client resource identifiers and client operational data may be stored in and retrieved from database 140.

Control server 122 may then determine the client device performance requirements based on the resources available at client device 110 and by considering and balancing various operational characteristics of client device 110. In some embodiments, control server 122 may determine the client device performance requirements based on whether any resources or operational characteristics of client device 110 result in a performance bottleneck for the emulation session.

For example, control server 122 may determine based on received client device data that client device 110 includes one or more low-performance resources that result in limited network bandwidth and low throughput between client device 110 and emulator system 120. Control server 122 may therefore determine that network throughput is a bottleneck in the perceived performance of emulator system 120 at client device 110, and that as a result, the user will not perceive any difference in performance among class 1, class 2, and class 3 service. To optimize allocation of emulation resources, control server 122 may therefore determine that the appropriate client device performance requirements for the emulation session is class 3 service, as the user is unlikely to experience any performance benefit from client device 110 receiving class 1 or class 2 service.

On the other hand, control server 122 may determine that client device 110 includes high-performance resources, and that as a result, the user will perceive differences in emulation performance among class 1, class 2 and class 3 service. In this case, control server 122 may determine that the appropriate client device performance requirements is, for example, class 1 service, as the user may experience an increased level of performance from client device 110 receiving class 1 service over class 2 or class 3 service.

Multiple Potential Classes of Service

In some embodiments, the context determination protocol may provide instructions for control server 122 to determine a class of service for the emulation session based on only one of the user account data such as service subscription data and historic usage; emulator system data; and client device data. The control server 122 can determine a user expected class of service from the user account data. In this case, control server 122 may set the emulation context to the user expected class of service. Alternatively, the control server 122 can determine a system expected class of service from the emulator system data. In this case, control server 122 may set the emulation context to the system expected class of service. Alternatively, the control server 122 can determine a client device performance requirement from the user account data. In this case, control server 122 may set the emulation context to the client device performance requirement.

In other embodiments, the context determination protocol may provide instructions for control server 122 to process two or more of user account data, emulator system data, and client device data to determine the class of service to provide. As a result, control server 122 may determine two or more potential classes of service for the emulation session. For example, control server 122 may determine that the user has a class 1 service subscription for the requested computer product. However, control server 122 may also determine based on historic usage data or the client device data that the appropriate class of service for the emulation session is class 2 service. For example, control server 122 may determine that the user requesting the emulation session on average utilizes a low amount of processing power, and is also requesting the emulation at a time of day during which there is a high expected demand for other emulation sessions requiring class 1 service.

In this case, the context determination protocol may specify a selection process for selecting which of the potential classes of service to set as the emulation context. In some embodiments, the context determination protocol may instruct control server 122 to set the emulation context to a required class of service based on a cost function for determining an associated cost for each potential class of service. The cost function may determine the cost for each potential class of service based, at least in part on, the cost to the system to provide the resources for the emulation, including opportunity cost of those resources not being available for other emulations; and the benefit of providing the resources for the emulation. In some embodiments, the cost function may determine that the cost associated with each potential class of service is proportional to the potential class of service.

The cost function may be implemented using various techniques to provide a particular output for given inputs. For instance, the cost function may receive various inputs such as the costs of providing a potential class of service (e.g. this may be assessed by assigning a cost value to resource instances corresponding to that potential class of service), the costs of providing a class of service to a user below their expectations (e.g. this may be assigned a cost value for all users, and/or the cost value may be weighted depending on the level of the user's subscription or other contextual factors such as previous service interruptions to that user) and benefits of providing that potential class of service—benefits to the user of accessing the resource instances associated with that potential class, as well as benefits to the system of making available some resource instances to other users that would be excluded by that potential class of service. The various benefits may be assigned values in a manner similar to the costs values.

Multivariable statistical techniques, such as regression analysis and machine learning techniques (linear and non-linear) may be used to assess these cost and benefit variables and determine the associated cost, the output of the cost function, for each potential class of service. The cost function may also receive weightings to apply to the various inputs differently depending on the emulation context. For instance, if the emulation context indicates that there is currently high demand for resource instances associated with a particular class of service, the cost to provide that class of service may be increased. Various other techniques for implementing the cost function may also be used.

A simplified example of a cost function that may be used to determine the associated cost with potential class 1 service and potential class 2 service is provided below. For example, a cost value for each input may be assessed on a scale from 0 to 20 where 20 indicates a high or undesirable cost to provide that potential class of service and 0 indicates a low or desirable cost of providing that potential class of service. All the cost values for a potential class of service may then be combined (e.g. by addition, multiplication, averaging etc.) to determine an associated cost for that potential class of service.

The cost value to the emulator system of resource instances for providing class 1 service and class 2 service may be 10 and 5, respectively. Since the user may expect, or be subscribed to receive class 1 service, the cost value of customer dissatisfaction may be 0 for providing class 1 service and 10 for providing class 2 service. The cost value of customer dissatisfaction, that is the 0 and 10 values, may be determined using various techniques, such as regression or machine learning techniques. The cost function may then be used to determine the associated cost of potential class 1 service and potential class 2 service as 10 and 15 respectively (using an additive cost function). In this case, the lowest cost class of service may be determined to be class 1 service.

In the example above, no weightings, or a unitary weighting, was applied to the cost value to resource instances and the cost value of customer dissatisfaction. For another example, the same inputs may be used, along with weighting inputs. If the emulation context indicates that there is currently high demand for resource instances, the weighting of the cost value to resource instances may be 2 and the cost value to customer dissatisfaction may remain at 1. As a result, the associated cost of potential class 1 service and potential class 2 service may be 20 and 15, respectively. In this case, the lowest cost class of service may be set to class 2 service. In some cases, the weighting inputs may be determined more granularly, for instance if there was greater demand for potential class 2 service at a particular time and less demand for class 1 service, then it may be desirable to provide class 1 service and the weighting inputs may be adjusted accordingly.

In another example, the lowest class of service of the potential classes of service may be associated with the lowest cost and the highest class of service of the potential classes of service may be associated with the highest cost. In such cases, if the potential service classes consist of class 1 service and class 2 service, then control server 122 may use the cost function to determine that the associated cost of the class 2 service is high. The control server 122 may set the emulation context to class 2 service to optimize resource allocation, as the user is unlikely to experience any noticeable performance benefit from client device 110 being provided with class 1 service.

In response to determining the emulation context at step 230, control server 122 can link the emulation context with the emulation session identifier. For example, control server 122 can store an emulation context identifier in database 140 in association with the emulation session identifier.

Step 240

If emulator system 120 includes a plurality of emulator servers, at step 240, control server 122 can identify, based on the emulation context determined at step 230, a set of potential emulator servers 126 for providing operating instances of each of the at least one kind of external hardware resource for the emulation session.

As noted above, in some embodiments, the emulation context may correspond to a class of service required for the emulation session. In such embodiments, control server 122 may identify the set of potential emulator servers 126 by identifying emulator servers 126 having a server class designation that corresponds to the required class of service determined at step 230.

A server class designation can correspond to a class of service that an emulator server 126 is capable of providing. For example, the server class designation may be one of a class 1 designation, class 2 designation, and class 3 designation. An emulator server 126 having a class 1 designation may be operable to provide class 1 service for the emulation session. An emulator server 126 having a class 2 designation may be operable to provide class 2 service for the emulation session. An emulator server 126 having a class 3 designation may be operable to provide class 3 service for the emulation session. The number of server class designations may correspond to the number of classes of service from which control server 122 can select to set as the emulation context.

A server class designation may be a static server-class-designation or a dynamic server-class-designation. A static server-class-designation may indicate the highest class of service an emulator server 126 is capable of providing, without considering current operational characteristics of the emulator server 126 or its resources. For example, a static server-class-designation may be based on the type, or kind of external hardware resource available at emulator server 126, and defined performance specifications of the server and its resources. A static server-class-designation identifier for each emulator server 126 may be stored in database 140. Control server 122 may therefore determine the server class designation for each emulator server 140 by retrieving respective static server-class-designation identifiers from database 140.

A dynamic server-class-designation for an emulator server 126 may indicate a predicted class of service an emulator server 126 may be operable to provide if that emulator server 126 is selected for providing the emulation session. The dynamic server-class-designation may be determined taking into account the computer product being requested, the defined performance specifications of the server, the at least one kind of external hardware resources usable for providing the emulation, and current operational characteristics of emulator server 126 and its resources, such as current availability, status, response time, resource load, efficiency, reliability, etc.

For example, control server 122 may request operational data from an emulator server 126. The operational data may define the operational characteristics of the emulator server 126, including the operational characteristics of its resources. In some embodiments, the operational data may define the availability and operational load, or usage, of each hardware component of the emulator server 126 usable for providing an operating instance of the at least one kind of external hardware resource for the requested emulation.

Based on the operational data and the computer product to be emulated, control server 122 may determine the expected class of service that can be provided if that emulator server 126 is selected for the emulation. In determining the expected class of service, control server 122 may also consider the number of other emulation sessions currently being provided by the emulator server 126, and the class of service corresponding to each of the other emulation sessions.

Control server 122 may then set the dynamic server-class-designation for the emulator server 126 to the determined expected class of service. To do so, control server 122 may store a dynamic server-class-designation identifier for the emulator server 126 in database 140.

In some embodiments, control server 122 may periodically request further operational data from each emulator server 126. Control server 122 may process received operational data to determine whether the current expected class of service of an emulator server 126 corresponds to the class of service indicated by the respective dynamic server-class-designation identifier stored in database 140. If the current expected class of service does not correspond to that indicated by the stored dynamic server-class-designation identifier, then control server 122 may update the dynamic server-class-designation identifier to correspond to the current expected class of service.

In some embodiments, control server 122 may determine that none of the emulator servers 126 are capable of providing a class of service within a threshold service level of the required class of service determined at step 230. In some embodiments, the threshold service level can require that the emulator servers 126 are capable of providing a class of service that is at least the next best class of service, or within at least one class of service of the required class of service. For example, the required class of service may be class 1 service. Control server 122 may determine based on respective static server-class-designations that emulator servers 126a, 126b, and 126c have class 1, class 2, and class 3 designations, respectively. However, control server 122 may further determine based on respective dynamic server-class-designations that emulator server 126a is incapable of providing class 1 service as a result of current operating conditions. For example, emulator server 126a may currently be operating near capacity as a result of providing other emulation sessions. As a result, emulator server 126a may currently be capable of providing only class 3 service if selected for providing the requested emulation session. In this case, control server 122 may include in the potential set of emulator servers 126 an emulator server 126 capable of providing the next best class of service for the emulation session, such as emulator server 126b which is capable of providing class 2 service.

Alternatively, control server 122 may rebalance the operational load among emulator servers 126 to free up resources of emulator server 126a so it can provide class 1 service for the requested emulation session. For example, control server 122 may determine that an identified emulation session being provided by emulator server 126a can be provided by emulator server 126b. Control server 122 may determine an initial server performance indicator defining a performance of the identified emulation session being provided by emulator server 126a. Control server 122 may determine a transitional server performance indicator defining an expected performance of the identified emulation being provided by emulator server 126b. Control server 122 may determine that the identified emulation session can be provided by emulator server 126b without compromising performance of the identified emulation session if the transitional server performance indicator is within a transition performance threshold of the initial server performance indicator. In this case, control server 122 may include emulator server 126 in the potential set of emulator servers 126 capable of providing the emulation session. As well, control server 122 may initiate a transition of the identified emulation session from emulator server 126a to emulator server 126b. In some embodiments, if emulator server 126b is not available, or no transition performance threshold is specified, the identified emulation session may be terminated in order to free up resources of emulator server 126a so it can provide the requested emulation session.

In some embodiments, the threshold service level can require that the emulator servers 126 are capable of providing a class of service that is equal to, or better than, the required class of service. In this case, control server 122 may identify the set of potential emulator servers 126 by identifying emulator servers 126 having a server class designation equal to, or better than the required class of service. For example, the required class of service determined at step 230 may be class 2 service. Control server 122 may determine that emulator servers 126a, 126b, and 126c are capable of providing class 1, class 2, and class 3 service, respectively.

Control server 122 may further determine that emulator server 126a is being underutilized, and is available to provide the emulation session without compromising performance of other emulation sessions currently being provided by emulator server 126a. In this, case, control server may include emulator server 126a and emulator server 126b in the set of potential emulator servers 126 for the emulation session.

Control server 122 may link identifiers corresponding to the potential emulator servers 126 identified at step 240 with the emulation session identifier. For example, control server 122 may operate to store an emulator server identifier for each potential emulator server 126 in association with the emulation session identifier. If emulator system 120 includes only one emulator server 126, then step 240 may be omitted, as shown by dashed lines in FIG. 2.

Step 245

At step 245, control server 122 may select one or more emulator servers 126 for providing the emulation from the set of potential emulator servers 126 identified at step 240. If the set of potential emulator servers 126 includes only one potential emulator server 126, then control server 122 may select that one potential emulator server 126 for providing the emulation session.

If the set of potential emulator servers 126 includes more than one potential emulator server 126, then control server 122 may select at least one emulator server 126 based on balancing various factors and considerations. For example, in some embodiments, control server 122 may make the selection based on a predefined order or a default selection that may be specified in database 140. In another example, control server 122 may select at least one emulator server 126 by considering and balancing various factors or operational characteristics of each potential emulator server 126 or its resources, such as computational performance, computational efficiency, availability, status, operational load, response time, geographical location, number of emulation sessions currently being provided, types of resources available, etc.

For example, in some embodiments, if the emulation context is set to class 1 service, then control server 122 may select a least busy potential emulator server 126 having a class 1 designation. When the emulation context is set to class 2 service, control server 122 may select a least busy potential emulator server 126 having a class 1 or class 2 designation. Similarly, when the emulation context is set to class 3 service, control server 122 may select a least busy potential emulator server 126 having a class 1, class 2, or class 3 designation.

In some embodiments, control server 122 may select an emulator server 126 from the set of potential emulator servers 126 using a server performance function. The server performance function may be used to determine a performance benchmark, or a server performance indicator, for an associated potential emulator server 126. The server performance indicator can indicate the relative performance of each potential emulator server 126. The server performance function may determine the performance benchmark, or the server performance indicator, based on one or more performance metrics. Performance metrics can include, for example, response time, processing speed, operational capacity, efficiency, reliability, etc.

Various techniques for implementing the server performance function may be used so that the server performance function provides a particular output for given inputs. For example, the server performance function may assess a particular emulator server 126 according to the various performance metrics and assign that particular emulator server 126 a metric score for each performance metric. The various metric scores may be normalized to a consistent range, such as 0-10 or 0-100 for example. The server performance function may then determine the server performance indicator, the output of the server performance function, for each emulator server using the normalized metric scores (e.g. as the average normalized metric score or the lowest normalized metric score). For example, the server performance function may function in a manner similar to performance measurements such as the Windows Experience Index.

In some embodiments, the performance benchmark, or server performance indicator, may be a static server-performance-benchmark. A static server-performance-benchmark may indicate the relative performance of a potential emulator server 126 based on its defined performance specifications, without considering current operational characteristics of the emulator server 126 or its resources. Control server 122 may retrieve the static server-performance-benchmark for each of the potential emulator servers 126 from database 140.

In some embodiments, the performance benchmark, or server performance indicator, may be a dynamic server-performance-benchmark. A dynamic server-performance-benchmark for a potential emulator server 126 may indicate a relative predicted, or expected, performance of a requested emulation session if that potential emulator server 126 is selected for the emulation. The dynamic server-performance-benchmark may be determined based on the defined performance specifications and performance metrics outlined above, taking into account the requested emulation and the current operational characteristics of the emulator server 126 and its resources.

For example, to determine the dynamic server-performance-benchmark for a potential emulator server 126, control server 122 may request operational data from the potential emulator server 126. The operational data may define the operational state and characteristics of the identified potential emulator server 126, including the operational state and characteristics of its resources. For example, the operational data may define the current usage of the potential emulator server 126, current availability and operational load of each hardware component of emulator server 126 required for providing the requested emulation.

Based on the operational data and the computer product to be emulated, control server 122 may predict the expected performance characteristics of the requested emulation if that potential emulator server 126 is selected for the emulation. Control server 122 may then determine the dynamic server-performance-benchmark based on the expected performance characteristics in view of one or more performance metrics.

In some embodiments, after determining or retrieving one or more server performance benchmarks, or server performance indicators, for each potential emulator server 126, control server 122 can use the server performance function to compare respective server performance benchmarks, or server performance indicators. The server performance function may determine that a ranking of each potential emulator server 126 based on the associated relative server performance indicators of that potential emulator server. For example, each potential emulator server 126 may be ranked in order of a particular associated relative server performance indicator of that potential emulator server 126. For example, the server performance function may rank the highest static server-performance-benchmark as a highest ranking. In another example, the server performance function may rank the highest dynamic server-performance-benchmark as a highest ranking. In some embodiments, for example, control server 122 can then select at least one potential emulator server 126 as the selected at least one emulator server 126 for the emulation session based on, for example, which potential emulator server 126 has at least one highest ranking.

After selecting an emulator server 126, control server 122 may link identifiers corresponding to the selected at least one emulator server 126 with the emulation session identifier. For example, control server 122 may operate to store the selected at least one emulator server identifier in database 140 in association with the emulation session identifier. In some embodiments, control server 122 may select more than one emulator server 126 for providing the emulation session. In this case, emulator server 126 may link emulator server identifiers for each selected emulator server 126 with the emulation session identifier.

Step 250

If at least one selected emulator server 126 includes a plurality of selected emulator servers 126, at step 250, control server 122 can identify, for each of the at least one kind of external hardware resource, at least one possible hardware resource that the at least one selected emulator server 126 is capable of providing an operating instance of. That is, operating instances for each of the at least one possible hardware resource may be specific to one of the at least one selected emulator server 126.

In some embodiments, a selected emulator server 126 may include multiple resources of a certain type, or kind, each corresponding to a type, or kind of external hardware resource usable for providing the emulation session. For example, the at least one kind of external hardware resource may be a type, or kind, of hardware component, and emulator server 126 may include two or more hardware components of that type. In some embodiments, emulator server 126 may be operable to provide an external hardware resource as both an emulated hardware resource and a non-emulated hardware resource.

FIG. 3

Figure 3:
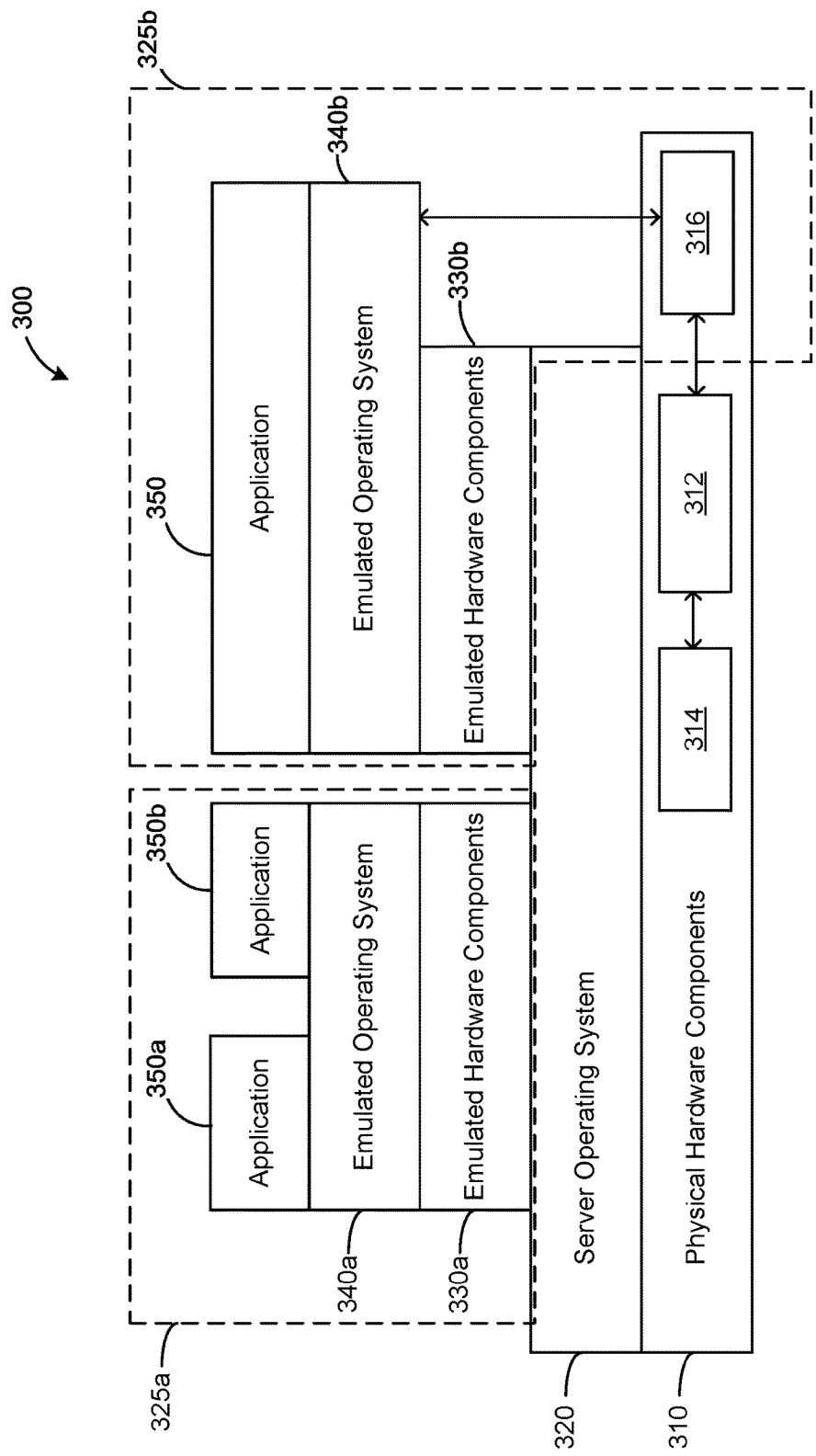
FIG. 3 is a simplified computer architecture diagram of an emulator server, in accordance with an example embodiment.

For example, reference is made to FIG. 3, which illustrates an example hardware and software layering architecture 300 of an emulator server 126 used for providing emulation sessions 325a and 325b.

Emulated hardware resources can be one or more emulated hardware components 330 operating above the level of server operating system 320. Emulated hardware components 330 can be software-based constructs operable to reproduce the function of hardware components usable for emulating a requested computer product. For example, the requested computer product of emulation session 325a may be an operating system 340a designed to execute on hardware components 330a, or one or more applications 350a, 350b designed to execute on operating system 340a. The emulated hardware components 330a may therefore form an emulated hardware architecture used for executing operating system 340a and applications 350a, 350b.

Non-emulated hardware resources can be one or more physical hardware components 310 of emulator server 126. Physical hardware components 310 form the physical hardware architecture of emulator server 126, and operate below the level of operating system 320. For example, physical hardware components 310 can include the main server processor 312 used to execute operating system 320, and can also include other hardware components 314, 316, such as memory, auxiliary processors, graphical processing units (GPUs), etc. Hardware components 314, 316 may be operable to communicate with the main server processor 312 via the internal server bus of emulator server 126. The internal server bus is the communication system that transfers data between physical hardware components 310 inside emulator server 126.

In some embodiments, the physical hardware components 310 of the emulator server 126 may include one or more hardware components usable for providing an emulation of a requested application 350c. For example, the requested application 350c may be the application Angry Birds™ for the Android™ platform. In this case, the kinds of hardware resources usable to provide emulated operating system 340b and application 350c may include at least an ARM™ (Advanced RISC Machine) processor. An ARM processor is a microprocessor based on the RISC (reduced instruction set computer) computer instruction set developed by ARM Holdings Public Limited Company. An ARM processor can be used to execute the Android operating system.

In some embodiments, hardware component 316 may be a physical ARM processor operable to communicate with the main server processor 312 below the level of operating system 320 via the internal server bus of emulator server 126. For example, the physical ARM processor may be operable to communicate with the main server processor via a PCI (peripheral component interconnect) bus. As shown in FIG. 3, the physical ARM processor 316 may be used to provide emulated operating system 340b and application 350c. The remaining kinds of hardware resources usable to provide operating system 340b and application 350c may be provided as emulated hardware components 330b.

Continuing with the above Angry Birds example, in addition to being operable to provide the ARM processor by using the physical ARM processor 316, emulator server 126 may also be operable to provide the required ARM processor through emulation (i.e., as one of the emulated hardware components 330b). In some embodiments, emulator system 120 may determine that it is more advantageous to use the physical ARM processor 316 for emulation session 325b due to, for example, the communication between the physical ARM processor 316 and the main server processor 312 occurring below the level of the server operating system 320. Communicating below the level of operating system 320 may result in faster communication than would occur between the main processor and an emulated hardware component 330b operating above the level of server operating system 320. Alternatively, if the physical ARM processor 316 is operating at capacity, or is otherwise unavailable, emulator system 120 may select to provide the ARM processor as an emulated hardware component 330b.

Step 255

Referring back to FIG. 2, at step 250, control server 122 may identify for each kind of external hardware resource, at least one possible resource that the at least one selected emulator server 126 is capable of providing an operating instance of. In some embodiments, control server 122 may request each of the at least one selected emulator server 126 to provide data identifying the operating instance of each kind of external hardware resource that that emulator server 126 is capable of providing. That is, operating instances of each of the at least one kind of external hardware resource may be specific to one of the at least one selected emulator server 126.

In some embodiments, database 140 may include data defining the kinds of hardware and software resources that each of the at least one selected emulator server 126 is capable of providing. Database 140 may further include data defining which kinds of these external hardware resources the at least one selected emulator server 126 is capable of providing both through emulation and by using a physical hardware component that is one of the at least one kind of external hardware resource usable for providing the emulation.

Control server 122 may therefore determine from data received from the at least one selected emulator server 126 or retrieved from database 140 which of the at least one kind of external hardware resource the at least one selected emulator server 126 is capable of providing an operating instance of. Control server 122 may then identify the respective identifiers for each of the at least one kind of external hardware resource of the at least one selected emulator server in database 140 as possible identifiers to link with the emulation session identifier.

In some embodiments, at step 255, control server 122 can operate to identify at least one potential resource providable by the at least one selected emulator server 126 from the at least one possible resource providable by the at least one selected emulator server 126 based on the emulation context determined at step 230. As noted above, the emulation context may correspond to a required class of service for the emulation session. In such embodiments, control server 122 may identify the at least one potential resource from the at least one possible resource based on which resource has a resource class designation corresponding to, or better than, or not less than, the required class of service.

Similar to the server class designations, a resource class designation can correspond to a class of service the possible resource is capable of providing. For example, a resource class designation may be one of a class 1 designation, class 2 designation, and class 3 designation. A possible resource having a class 1 designation may be operable to provide class 1 service for the emulation session. A possible resource having a class 2 designation may be operable to provide class 2 service for the emulation session. A possible resource having a class 3 designation may be operable to provide class 3 service for the emulation session. The number of resource class designations may correspond to the number of classes of service from which control server 122 can select to set as the emulation context.

A resource class designation may be a static resource-class-designation or a dynamic resource-class-designation. A static resource-class-designation may indicate the highest class of service a particular possible resource is capable of providing, without considering current operational characteristics of the possible resource or the at least one selected emulator server 126. A static resource-class designation may be based on the type, or kind, of external hardware resource and defined performance specifications of the possible resource and the selected emulator server 126 that provides the operating instance of the possible resource. A static resource-class-designation identifier for each of the hardware resources of the at least one selected emulator server 126 may be stored in database 140. Control server 122 may therefore determine the resource class designation for each possible resource by retrieving respective static resource-class-designation identifiers from database 140.

A dynamic resource-class-designation for a possible resource may indicate a predicted class of service an emulator server 126 may be operable to provide if that possible resource is selected for providing the emulation session. The dynamic resource-class-designation may be determined taking into account the computer product being requested, the defined performance specifications of the emulator server 126, other resources usable for providing the emulation, and current operational characteristics of emulator server 126 and the other resources, such as current availability, status, response time, resource load, efficiency, reliability, etc.

For example, control server 122 may request operational data from each of the at least one selected emulator server 126. The operational data may define the operational characteristics of the possible resources. In some embodiments, the operational data may define the availability and operational load, or usage, of the possible resources of the at least one selected emulator server 126.

Based on the operational data and the computer product to be emulated, control server 122 may determine an expected class of service that can be provided by each of the possible resources if that possible resource is selected. Control server 122 may then set the respective dynamic resource-class-designation for each of the at least one possible resource to the respective expected class of service. To do so, control server 122 may store a dynamic resource-class-designation identifier for each resource in database 140.

In some embodiments, control server 122 may periodically request further operational data from the at least one selected emulator server 126. Control server 122 may process received operational data to determine whether the current expected class of service of the possible resource corresponds to the class of service indicated by the respective dynamic resource-class-designation identifier stored in database 140. If the current expected class of service does not correspond to that indicated by the stored dynamic resource-class-designation identifier, then control server 122 may update the dynamic resource-class-designation identifier to correspond to the current expected class of service.

Step 260

In some embodiments, control server 122 may identify a plurality of potential resources for one of the at least one kind of external hardware resource. For example, as noted above, at step 250, control server 122 may select more than one emulator server 126 for providing the emulation session. In some embodiments, more than one of the selected emulator servers 126 may be capable of providing the possible hardware resource as both an emulated hardware resource and a non-emulated hardware resource. Further, in some embodiments, one selected emulator server 126 may be capable of providing the possible hardware resource only as an emulated hardware resource, whereas another selected emulator server 126 may be capable of providing the possible hardware resource only as a non-emulated hardware resource. In addition, in some embodiments, an identified emulator server 126 may include two or more non-emulated hardware resources, each capable of being provided as the possible hardware resource. For example, the at least one kind of external hardware resource may be an ARM processor, and the identified emulator server 126 may include two physical ARM processors, each in communication with the main processor of emulator server 126 via a PCI bus.

In this case, at step 260, control server 122 may select among each potential resource providable by a particular selected emulator server 126 of the at least one selected emulator server 126 for each of the at least one kind of external hardware resource to utilize for the emulation session.

In some embodiments, control server 122 may select a resource based on default selection criteria stored in database 140. For example, the default selection criteria may specify that non-emulated hardware resources should be selected by default in cases where possible resources include both emulated and non-emulated hardware resources. In some embodiments, specifying the non-emulated hardware resource as the default selection may be preferred. As outlined above, non-emulated hardware resources may be operable to communicate with the main processor of the selected emulator server 126 directly via the internal server bus. As a result, non-emulated hardware resources can generally provide improved performance compared to emulated hardware resources. The default selection criteria may further specify a particular non-emulated hardware resource should be selected by default in cases where possible resources include multiple non-emulated hardware resources.

Alternatively, or if no default selection is specified, control server 122 may select a resource from the potential resources using a resource performance function. The server performance function may be used to determine a resource performance benchmark, or resource performance indicator, indicating the relative performance of an associated potential resource. The resource performance function may determine the resource performance benchmark, or the resource performance indicator, based on one or more performance metrics. Performance metrics can include, for example, response time, processing speed, operational capacity, efficiency, reliability, etc. The current operational characteristics of a potential resource and the at least one selected emulator server 126 may be considered in determining the resource performance benchmark, or the resource performance indicator. The resource performance function may operate in a manner similar to the server performance function described above.

In some embodiments, the resource performance benchmark, or the resource performance indicator may be a static resource-performance-benchmark. A static resource-performance-benchmark may indicate the relative performance of a potential resource based on its defined performance specifications, without considering current operational characteristics of the potential resource or the selected at least one emulator server 126. For example, a static resource-performance-benchmark may be based on the minimum, average, or maximum response time of a potential resource, the maximum effective processing power of a potential resource, etc. Control server 122 may retrieve the static resource-performance-benchmark for the potential resources from database 140.

In some embodiments, the performance benchmark, or the resource performance indicator may be a dynamic resource-performance-benchmark. A dynamic resource-performance-benchmark for a potential resource may indicate a relative predicted performance of a requested emulation session if that potential resource is selected for the emulation. The dynamic resource-performance-benchmark may be determined based on the performance metrics outlined above, taking into account the requested emulation and the current operational characteristics of the potential resource and the at least one selected emulator server 126.

For example, to determine the dynamic resource-performance-benchmark for a potential resource providable by a particular selected emulator server, control server 122 may request operational data from the particular selected emulator server 126. The operational data may define the operational state and characteristics of the particular selected emulator server 126, including the operational state and characteristics of its resources. For example, the operational data may define the current availability and operational load of each physical hardware component of the particular emulator server 126 usable for providing the requested emulation.

Based on the operational data and the computer product to be emulated, control server 122 may predict the expected performance characteristics of the requested emulation if the potential resource providable by the particular selected emulator server is selected for the emulation. Control server 122 may then determine the dynamic resource-performance-benchmark based on the expected performance characteristics in view of one or more performance metrics. A similar method may be followed to determine the dynamic resource-performance-benchmark for another potential resource providable by the particular selected emulator server, or another potential resource providable by another particular selected emulator server.

In some embodiments, after determining or retrieving one or more resource performance benchmarks, or resource performance indicators, for each of the at least one potential resource, control server 122 can compare respective resource performance benchmarks, or resource performance indicators. The resource performance function may determine that a ranking of each potential resource based on the associated relative resource performance indicator of that potential resource. For example, the resource performance function may rank the highest static resource-performance-benchmark as a highest ranking. In another example, the resource performance function may rank the highest dynamic resource-performance-benchmark as a highest ranking. In some embodiments, for example, control server 122 can then select between the a potential resource providable by a particular emulator server as the selected resource for a particular kind of external hardware resource for the emulation based on, for example, which potential resource has the highest ranking.

In response to making a selection at step 260, control server 122 can link selection data with the session identifier and the corresponding resource identifiers. For example, control server 122 can store the selection data in database 140 in association with the session identifier, the selected emulator server identifier, and the hardware resource identifiers. The selection data may identify which resources available at the at least one selected emulator server 126 to utilize for the emulation session, as well as which hardware resources to provide as emulated hardware resources and which hardware resources to provide as non-emulated hardware resources. In some embodiments, the selection data may also identify which emulator servers 126 are to provide respective kinds of external hardware resources.

Step 270

At step 270, control server 122 can initiate the emulation session by instructing the at least one selected emulator server 126 to provide the requested emulation to client device 110 using the selected resources selected at step 260.

In some embodiments, control server 122 may access database 140 to define session data for the emulation session based on the emulation session identifier. The information to be provided as part of the session data may already be linked to the relevant emulation session identifier or may not yet be linked. For example, defining session data for the emulation session may include linking stored data, such as emulation parameters and identifiers, for use in initiating, providing, and managing the emulation.

In some embodiments, the session data can include the resource identifiers for identifying the at least one kind of external hardware resources usable to provide the emulation; emulation context identifiers for identifying the class of service to provide for the emulation session; emulator server identifiers for identifying the at least one selected emulator servers 126; selection data for identifying selected resources instances providable by one of the at least one selected emulator server for each of the at least one kind of external hardware resource to utilize and whether to provide certain kinds of external hardware resources as emulated or non-emulated hardware resources; and the emulation data defining, for example, the computer product to be emulated and one or more properties of the emulation.

Once the session data is defined, control server 122 can proceed, based on the session data, to initiate the operation of the at least one selected emulator server 126 to provide the requested emulation. For example, the control server 122 may operate to send an initiation request to the at least one selected emulator server 126. The initiation request may include the emulation request and initiation parameters of the emulation corresponding to the emulation request. The initiation parameters of the emulation may include, for example, a list of at least one kind of external hardware resource usable for providing the emulation, as well as the emulation context identifier and the selection data identifying which available resources of emulator server 126 to utilize and whether to provide a certain kind of external hardware resource as an emulated or a non-emulated hardware resource.

In response to receiving the initiation request, emulator server 126 may proceed to initialize the selected resources usable for providing the emulation pursuant to the initiation parameters and the emulation request received from client device 110. For example, emulator server 126 may initialize the selected emulated and non-emulated hardware components and other resources usable for providing the emulation, such as operating system components and application components. If control server 122 selected more than one emulator server 126 for providing the emulation sessions, then emulator server 126 or control server 122 may request the other emulator server 126 to initialize and make available one or more of the at least one kind of external hardware resource for the emulation session. After the at least one kind of external hardware resource is initialized, the at least one selected emulator server 126 may operate to provide the emulation to client device 110.

In response to the emulation being provided to client device 110, control server 122 may designate the emulation session as an active emulation session.

Step 280

In some embodiments, the process 200 terminate after the emulation is initialized, as shown by dashed lines in FIG. 2. In other embodiments, the process 200 may continue to step 280. At step 280, control server 122 may operate to monitor and manage the active emulation session provided to the client device 110. In some embodiments, during the emulation session, control server 122 may monitor, by considering additional context data, to determine whether to vary the allocation of resources for the emulation session. Control server 122 may determine to vary the allocation of resources in response to, for example, determining based on the additional context data that the appropriate class of service for the active emulation session is different from the class of service determined at step 230.

For example, control server 122 may have determined at step 230 based on the subscription data that the user has a subscription to class 1 service. Control server may have, however, set the emulation context to class 2 service based on the historic usage data indicating that the user, on average, utilizes a low amount of processing power during emulation sessions for the requested computer product. Accordingly, to optimize resource allocation, control server 122 may have selected emulator server 126b having a class 2 designation for the emulation session.

After initiating the emulation session, control server 122 may determine at least one potential alternative class of service based on at least one of historic global usage data, current global usage data, and current emulation usage data. The current global usage data can indicate the current usage across all user accounts for each computer product emulator system 120 is capable of providing to client device 110. Current emulation usage data can indicate the current usage of the current emulation provided to client device 110. For example the potential alternative class of service based on current emulation usage data for the active emulation session can be class 1 service. In this case, the user may be utilizing the emulation session for applications that are more computationally intensive than anticipated based on the class of service initially selected based on the user's historic usage data. In some embodiments, control server 122 may provide a cost function for determining an associated cost, for each of the required class of service initially determined and the at least one potential alternative class of service. The control server 122 may use the cost function to determine an updated lowest cost class of service from the required class of service initially determined and the at least one potential alternative class of service. The cost function may determine the associated cost for each of the required class of service initially determined and the at least one potential alternative class of service using at least one of historic global usage data, the current global usage data, and the current emulation usage data. In some embodiments, control server 122 may set the updated required class of service to the updated lowest cost class of service. For example, the required class of service initially determined may be class 2 service, and the at least one potential alternative class of service may be class 1 service. The control server 122 may use the cost function to determine that the associated cost of the class 2 service is high. The control server may set the updated required class of service for the emulation session to be class 1 service.

To provide the updated required class of service for the emulation session, control server 122 may instruct emulator server 126b to rebalance its operational load and allocate additional resources for the emulation session, or may request other emulator servers 126 to provide additional resources for the emulation session. In some embodiments, rebalancing operational load may include transitioning another emulation, or operating instances of the at least one kind of external hardware resources, being provided by emulator server 126b to another emulator server, or discontinuing the provision of the other emulation, or the operating instance of the at least one kind of external hardware resource, by emulator server 126b.

In some embodiments, emulator server 126b may be incapable of providing class 1 service. In this case, control server 122 may determine whether, for example, emulator server 126*a* is capable of providing class 1 service for the emulation session. If so, control server 122 may initiate a transition of the emulation session from emulator server 126*b* to emulator server 126*a* to provide class 1 service, in order to improve performance of the emulation session.

In some embodiments, control server 122 may initiate a transition of the emulation session between emulator servers 126 based on a high expected demand for a class of service. For example, control server 122 may have determined at step 230 based on subscription data that the user requesting the emulation session has a subscription to class 2 service. However, control server 122 may have selected at step 250 emulator server 126*a* having a class 1 designation for the emulation session. The selection of emulator server 126*a* may have been a result of determining that emulator server 126*a* was being underutilized and therefore available for providing the emulation session.

Control server 122 may subsequently determine based on historic global usage data that there will be a high demand at a certain time for emulator server 126*a* to provide class 1 service for users having class 1 service subscriptions. In this case, control server 122 may initiate, prior to that time, a transition of the emulation session from emulator server 126*a* to emulator server 126*b* having a class 2 designation. The transition can free up resources of emulator server 126*a* so it can meet the expected demand for class 1 service from users having class 1 service subscriptions.

In some embodiments, control server 122 may select to transition between resources allocated to an emulation session based on context data. For example, control server 122 may determine that an emulation session corresponding to a class 1 service subscription is to receive prioritized allocation of a high-performance non-emulated hardware resource of emulator server 126*a*. Control server 122 may, however, determine that an emulation session corresponding to a class 2 service subscription is currently utilizing the high-performance non-emulated hardware resource. In this case, control server 122 may initiate a transition for the emulation session corresponding to the class 2 service subscription from the high-performance non-emulated hardware resource to a lower-performance emulated hardware resource. Control server 122 may then instruct emulator server 126*a* to allocate the high-performance non-emulated hardware resource for the emulation session corresponding to the class 1 service subscription.

It will be understood that different variations of process 200 may be provided.

The present invention has been described here by way of example only. Various modifications and variations may be made to these exemplary embodiments without departing from the spirit and scope of the invention.

The invention claimed is:

1. A method of providing an emulation of a computer product, the method comprising:
  receiving an emulation request for the computer product from a client device;
  determining from the emulation request and the client device a plurality of emulation parameters, including the computer product to be emulated,
  context data defining an emulation context for the emulation, the context data comprising at least one of client device data defining resource characteristics of the client device, user account data associated with a user of the client device requesting the emulation, and emulator system data defining characteristics of an emulator system providing the emulation, and
  at least one kind of external resource usable to provide the emulation of the computer product, the at least one kind of external resource comprising at least one kind of external hardware resource usable to provide the emulation of the computer product, the at least one kind of external hardware resource not being providable by the client device, the at least one kind of external hardware resource being providable by the emulator system;
  determining a required class of service for providing the emulation based on the context data, the required class of service being one of a plurality of classes of service;
  determining a plurality of possible resource instances, each possible resource instance in the plurality of possible resource instances being individually providable by the emulator system to provide the at least one kind of external hardware resource;
  selecting at least one selected resource instance from the plurality of possible resource instances to provide an operating instance of the at least one kind of external hardware resource for the emulation based at least in part on the required class of service; and
  providing the emulation to the client device using the at least one selected resource instance.

2. The method of claim 1, wherein the determining the required class of service comprises:
  determining a plurality of potential classes of service for providing the emulation from the at least one of the client device data, the user account data, and the emulator system data, the plurality of classes of service comprising the plurality of potential classes of service;
  providing a cost function for determining an associated cost, for each potential class of service in the plurality of potential classes of service; and,
  using the cost function, determining a lowest cost class of service in the plurality of potential classes of service as the required class of service.

3. The method of claim 1, wherein:
  the at least one of client device data, user account data and emulator system data comprises the client device data;
  the client device data comprises at least one of client resource data and client operational data, the client resource data defining kinds of hardware resources providable by the client device and the client operational data defining usage of the kinds of hardware resources providable by the client device other than for the emulation; and
  determining the required class of service comprises:
  determining client device performance requirements from the client device data, the client device performance requirements defining a level of performance that is perceivable by the user of the client device; and
  determining the required class of service based, at least in part, on the client device performance requirements.

4. The method of claim 1, wherein:
  the at least one of client device data, user account data and emulator system data comprises the user account data;
  the user account data comprises at least one of service subscription data defining a subscribed class of service required for emulation requests from the user, product subscription data defining a subscribed class of service required for emulation requests for a particular computer product from the user, and historic usage data defining usage of past emulations provided for the user; and
  determining the required class of service comprises:
  determining a user expected class of service for the user based on the user account data, the user expected class of service defining a level of performance the user is expected to require for the emulation; and determining the required class of service based, at least in part, on the user expected class of service.

5. The method of claim 1, wherein:

the at least one of client device data, user account data and emulator system data comprises the emulator system data;

the emulator system data comprises at least one of historic global usage data and current global usage data, the historic global usage data defining usage of the at least one kind of external resource for past emulations provided by the emulator system including past emulations provided to the user and past emulations provided to other users, and the current global usage data defining current usage of the at least one kind of external resource other than for the emulation; and determining the required class of service comprises:

determining a system expected class of service for the emulation based on the emulator system data, the system expected class of service defining a level of performance expected to be required from the emulator system for the emulation; and determining the required class of service based, at least in part, on the system expected class of service.

6. The method of claim 1, further comprising:

for each of the at least one kind of external hardware resource, determining, for each possible resource instance, at least one associated resource class designation, each associated resource class designation in the at least one associated resource class designation defining a class of service providable by that possible resource instance;

identifying at least one potential resource instance from amongst the plurality of possible resource instances, wherein each possible resource instance in the plurality of resource instances is identified as one of the at least one potential resource instance if and only if resource class designation corresponding to that particular possible resource instance is not less than the required class of service for providing the emulation; and selecting the at least one selected resource instance for providing the emulation from amongst the at least one potential resource instance.

7. The method of claim 6, wherein for each kind of external hardware resource, the resource class designation for each possible resource instance in the plurality of possible resource instances of that kind is defined by a static resource class designation for that possible resource instance, the static resource class designation determined based at least in part on defined performance specifications of that possible resource instance for that kind of external hardware resource.

8. The method of claim 6, wherein for each kind of external hardware resource, the resource class designation for each possible resource instance in the plurality of possible resource instances of that kind is defined by a dynamic resource class designation for that resource instance, the dynamic resource class designation determined based at least in part on a resource operational characteristic and defined performance specifications of that possible resource instance for that kind of external hardware resource, the resource operational characteristic defining usage of that possible resource instance other than for the emulation.

9. The method of claim 6, wherein for at least one kind of external hardware resource, the at least one potential resource instance comprises a plurality of potential resource instances and the selecting the at least one selected resource instance for providing the emulation comprises providing a resource performance function usable to determine a relative performance indicator for each potential resource instance in the plurality of potential resource instances, the relative performance indicator for each potential resource instance defining performance of that potential resource instance;

using the resource performance function to determine at least one highest ranking potential resource instance from the plurality of potential resource instances identified for that kind of external hardware resource; and determining the at least one highest ranking potential resource instance as the at least one selected resource instance.

10. The method of claim 1, wherein the emulator system comprises a plurality of emulator servers, each emulator server capable of providing at least one particular kind of external resource in the at least one kind of external resource usable to provide the emulation, and the method further comprises:

determining for each emulator server an associated server class designation defining at least one class of service providable by that emulator server, the associated server class designation determined based at least in part on server specific resource instances providable by that emulator server;

selecting the at least one selected resource instance by identifying at least one potential resource instance from the plurality of possible resource instances by identifying a plurality of potential emulator servers from the plurality of emulator servers, wherein an emulator server is identified as a potential emulator server if and only if the server class designation corresponding to that emulator server is within a threshold service level of the required class of service for providing the emulation;

selecting at least one selected emulator server from amongst the plurality of potential emulator servers;

identifying the server specific resource instances providable by each selected emulator server of the at least one selected emulator server, each server specific resource instance corresponding to one of the possible resource instances; and identifying the at least one potential resource instance from amongst the server specific resource instances; and selecting the at least one selected resource instance from amongst the at least one potential resource instance.

11. The method of claim 10, wherein:

for each emulator server, the server class designation comprises a static server class designation for that emulator server, the static server class designation defining a highest class of service providable by that emulation server, the static server class designation determined based at least in part on defined performance specifications of that emulator server and the server specific resource instances providable by that emulator server; and the identifying at least one potential emulator server is based on the static server class designation.

12. The method of claim 10, wherein:

for each emulator server, the server class designation comprises a dynamic server class designation for that emulator server, the dynamic server class designation determined based at least in part on a server operational characteristic and the defined performance specifications of that emulator server, the server operational characteristic defining usage of that emulator server other than for the emulation including usage of the server specific resource instances providable by that emulator server; and the identifying at least one potential emulator server is based on the dynamic server class designation.

13. The method of claim 10, wherein a particular emulator server of the plurality of potential emulator servers is initially providing a second emulation at a second client device, and that particular emulator server is identified as one of the plurality of potential emulator servers by:

identifying current usage of that particular emulator server to provide the second emulation at the second client device;

determining an initial server performance indicator and a transitional server performance indicator, the initial server performance indicator defining a performance of the second emulation being provided by that particular emulator server, the transitional server performance indicator defining an expected performance of the second emulation being provided by a second particular emulator server of the plurality of emulator servers; and identifying the particular emulator server as a particular potential emulator server in the plurality of potential emulator servers based on the transition performance indicator being within a transition performance threshold of the initial server performance indicator.

14. The method of claim 10, wherein the selecting at least one selected emulator server from amongst the plurality of potential emulator servers comprises:

providing a server performance function usable to determine a relative server performance indicator for each potential emulator server in the plurality of potential emulator servers, the relative server performance indicator defining performance of that emulator server; and using the server performance function, determining at least one highest ranking potential emulator server as the at least one selected emulator server.

15. The method of claim 14, wherein the server performance function is usable to determine the relative server performance indicator for each potential emulator server in the plurality of potential emulator servers based, at least in part, on an expected performance providable by that potential emulator server, the expected performance being determined based on current usage of that potential emulator server including usage of the server-specific resource instances providable by that potential emulator server.

16. The method of claim 1, wherein subsequent to the providing the emulation to the client device using the at least one selected resource instance the method further comprises:

determining at least one potential alternative class of service for providing the emulation to the client device, each potential alternative class of service being a different one of the plurality of potential classes of service;

providing a cost function for determining an associated cost, for each of the required class of service and the at least one potential alternative class of service;

using the cost function, determining an updated lowest cost class of service from the required class of service and the at least one potential alternative class of service, wherein the associated cost for each of the required class of service and the at least one potential alternative class of service is determined using at least one of historic global usage data, current global usage data and current emulation usage data, the current emulation usage data defining usage of the emulation at the client device, the historic global usage data defining usage of the at least one kind of external resource for past emulations provided by the emulator system including past emulations provided to the user and past emulations provided to other users, and the current global usage data defining current usage of the at least one kind of external resource other than for the emulation;

determining an updated required class of service for providing the emulation as the updated lowest cost class of service;

selecting at least one updated selected resource instance for providing the emulation based at least in part on the updated required class of service, the at least one updated selected resource instance including at least one particular updated selected resource instance that is different from a particular selected resource instance of the at least one selected resource instance; and transitioning the emulation to be provided using the at least one updated selected resource instance.

17. A system of providing an emulation of a computer product, the system comprising:

an emulation control server for communicating with a client device over a network, wherein the emulation control server is configured to:

receive an emulation request for the computer product from the client device;

determine from the emulation request and the client device a plurality of emulation parameters, including the computer product to be emulated, context data defining an emulation context for the emulation, the context data comprising at least one of client device data defining resource characteristics of the client device, user account data associated with a user of the client device requesting the emulation, and emulator system data defining characteristics of an emulator system providing the emulation, and at least one kind of external resource usable to provide the emulation of the computer product, the at least one kind of external resource comprising at least one kind of external hardware resource usable to provide the emulation of the computer product, the at least one kind of external hardware resource not being providable by the client device, the at least one kind of external hardware resource being providable by the emulator system;

determine a required class of service for providing the emulation based on the context data, the required class of service being one of a plurality of classes of service;

determine a plurality of possible resource instances, each possible resource instance in the plurality of possible resource instances being individually providable by the emulator system to provide the at least one kind of external hardware resource;

select at least one selected resource instance from the plurality of possible resource instances to provide an operating instance of the at least one kind of external hardware resource for the emulation based at least in part on the required class of service; and provide the emulation to the client device using the at least one selected resource instance.

18. The system of claim 17, wherein the emulation control server is configured to determine a required class of service by:

determining a plurality of potential classes of service for providing the emulation from the at least one of the client device data, the user account data, and the emulator system data, the plurality of classes of service comprising the plurality of potential classes of service;

providing a cost function for determining an associated cost, for each potential class of service in the plurality of potential classes of service; and, using the cost function, determining a lowest cost class of service in the plurality of potential classes of service as the required class of service.

19. The system of claim 17, wherein:
the at least one of client device data, user account data and emulator system data comprises the client device data;
the client device data comprises at least one of client resource data and client operational data, the client resource data defining kinds of hardware resources providable by the client device and the client operational data defining usage of the kinds of hardware resources providable by the client device other than for the emulation; and
the determine the required class of service comprises:
determine client device performance requirements from the client device data, the client device performance requirements defining a level of performance that is perceivable by the user of the client device; and
determine the required class of service based, at least in part, on the client device performance requirements.

20. The system of claim 17, wherein:
the at least one of client device data, user account data and emulator system data comprises the user account data;
the user account data comprises at least one of service subscription data defining a subscribed class of service required for emulation requests from the user, product subscription data defining a subscribed class of service required for emulation requests for a particular computer product from the user, and historic usage data defining usage of past emulations provided for the user; and
the determine the required class of service comprises:
determining a user expected class of service for the user based on the user account data, the user expected class of service defining a level of performance the user is expected to require for the emulation; and
determining the required class of service based, at least in part, on the user expected class of service.

21. The system of claim 17, wherein:
the at least one of client device data, user account data and emulator system data comprises the emulator system data;
the emulator system data comprises at least one of historic global usage data and current global usage data, the historic global usage data defining usage of the at least one kind of external resource for past emulations provided by the emulator system including past emulations provided to the user and past emulations provided to other users, and the current global usage data defining current usage of the at least one kind of external resource other than for the emulation; and
the determine the required class of service comprises:
determining a system expected class of service for the emulation based on the emulator system data, the system expected class of service defining a level of performance expected to be required from the emulator system for the emulation; and
determining the required class of service based, at least in part, on the system expected class of service.

22. The system of claim 17, the emulation control server is further configured to:
for each of the at least one kind of external hardware resource,
determine, for each possible resource instance, at least one associated resource class designation, each associated resource class designation in the at least one associated resource class designation defining a class of service providable by that possible resource instance;
identify at least one potential resource instance from amongst the plurality of possible resource instances, wherein each possible resource instance in the plurality of resource instances is identified as one of the at least one potential resource instance if and only if resource class designation corresponding to that particular possible resource instance is not less than the required class of service for providing the emulation; and
select the at least one selected resource instance for providing the emulation from amongst the at least one potential resource instance.

23. The system of claim 22, wherein for each kind of external hardware resource, the resource class designation for each possible resource instance in the plurality of possible resource instances of that kind is defined by a static resource class designation for that possible resource instance, the static resource class designation determined based at least in part on defined performance specifications of that possible resource instance for that kind of external hardware resource.

24. The system of claim 22, wherein for each kind of external hardware resource, the resource class designation for each possible resource instance in the plurality of possible resource instances of that kind is defined by a dynamic resource class designation for that resource instance, the dynamic resource class designation determined based at least in part on a resource operational characteristic and defined performance specifications of that possible resource instance for that kind of external hardware resource, the resource operational characteristic defining usage of that possible resource instance other than for the emulation.

25. The system of claim 22, wherein for at least one kind of external hardware resource,
the at least one potential resource instance comprises a plurality of potential resource instances and the selecting the at least one selected resource instance for providing the emulation comprises
providing a resource performance function usable to determine a relative performance indicator for each potential resource instance in the plurality of potential resource instances, the relative performance indicator for each potential resource instance defining performance of that potential resource instance;
using the resource performance function to determine at least one highest ranking potential resource instance from the plurality of potential resource instances identified for that kind of external hardware resource; and
determining the at least one highest ranking potential resource instance as the at least one selected resource instance.

26. The system of claim 17, wherein:
the system further comprises a plurality of emulator servers, the plurality of emulator servers being coupled to the emulation control server, each emulator server capable of providing at least one particular kind of external resource in the at least one kind of external resource usable to provide the emulation; and
the emulation control server is further configured to:

determine for each emulator server an associated server class designation defining at least one class of service providable by that emulator server, the associated server class designation determined based at least in part on server specific resource instances providable by that emulator server;

select the at least one selected resource instance by identifying at least one potential resource instance from the plurality of possible resource instances by identifying a plurality of potential emulator servers from the plurality of emulator servers, wherein an emulator server is identified as a potential emulator server if and only if the server class designation corresponding to that emulator server is within a threshold service level of the required class of service for providing the emulation;

selecting at least one selected emulator server from amongst the plurality of potential emulator servers;

identifying the server specific resource instances providable by each selected emulator server of the at least one selected emulator server, each server specific resource instance corresponding to one of the possible resource instances; and identifying the at least one potential resource instance from amongst the server specific resource instances; and selecting the at least one selected resource instance from amongst the at least one potential resource instance.

27. The system of claim 26, wherein:

for each emulator server, the server class designation comprises a static server class designation for that emulator server, the static server class designation defining a highest class of service providable by that emulation server, the static server class designation determined based at least in part on defined performance specifications of that emulator server and the server specific resource instances providable by that emulator server; and the identifying at least one potential emulator server is based on the static server class designation.

28. The system of claim 26, wherein:

for each emulator server, the server class designation comprises a dynamic server class designation for that emulator server, the dynamic server class designation determined based at least in part on a server operational characteristic and the defined performance specifications of that emulator server, the server operational characteristic defining usage of that emulator server other than for the emulation including usage of the server specific resource instances providable by that emulator server; and the identifying at least one potential emulator server is based on the dynamic server class designation.

29. The system of claim 26, wherein a particular emulator server of the plurality of potential emulator servers is initially providing a second emulation at a second client device, and the emulation control server is configured to identify that particular emulator server as one of the plurality of potential emulator servers by:

identifying current usage of that particular emulator server to provide the second emulation at the second client device;

determining an initial server performance indicator and a transitional server performance indicator, the initial server performance indicator defining a performance of the second emulation being provided by that particular emulator server, the transitional server performance indicator defining an expected performance of the second emulation being provided by a second particular emulator server of the plurality of emulator servers; and identifying the particular emulator server as a particular potential emulator server in the plurality of potential emulator servers based on the transition performance indicator being within a transition performance threshold of the initial server performance indicator.

30. The system of claim 26, wherein the selecting at least one selected emulator server from amongst the plurality of potential emulator servers comprises:

providing a server performance function usable to determine a relative server performance indicator for each potential emulator server in the plurality of potential emulator servers, the relative server performance indicator defining performance of that emulator server; and using the server performance function, determining at least one highest ranking potential emulator server as the at least one selected emulator server.

31. The system of claim 30, wherein the server performance function is usable to determine the relative server performance indicator for each potential emulator server in the plurality of potential emulator servers based, at least in part, on an expected performance providable by that potential emulator server, the expected performance being determined based on current usage of that potential emulator server including usage of the server-specific resource instances providable by that potential emulator server.

32. The system of claim 17, wherein subsequent to the providing the emulation to the client device using the at least one selected resource instance, the emulation control server is further configured to:

determine at least one potential alternative class of service for providing the emulation to the client device, each potential alternative class of service being a different one of the plurality of potential classes of service;

providing a cost function for determining an associated cost, for each of the required class of service and the at least one potential alternative class of service;

using the cost function, determine an updated lowest cost class of service from the required class of service and the at least one potential alternative class of service, wherein the associated cost for each of the required class of service and the at least one potential alternative class of service is determined using at least one of historic global usage data, current global usage data and current emulation usage data, the current emulation usage data defining usage of the emulation at the client device, the historic global usage data defining usage of the at least one kind of external resource for past emulations provided by the emulator system including past emulations provided to the user and past emulations provided to other users, and the current global usage data defining current usage of the at least one kind of external resource other than for the emulation;

determine an updated required class of service for providing the emulation as the updated lowest cost class of service;

select at least one updated selected resource instance for providing the emulation based at least in part on the updated required class of service, the at least one updated selected resource instance including at least one particular updated selected resource instance that is different from a particular selected resource instance of the at least one selected resource instance; and transition the emulation to be provided using the at least one updated selected resource instance.

33. A non-transitory computer-readable storage medium upon which a plurality of instructions are stored, the instructions for performing a method of providing an emulation of a computer product, the method comprising:

receiving an emulation request for the computer product from a client device;

determining from the emulation request and the client device a plurality of emulation parameters, including the computer product to be emulated, context data defining an emulation context for the emulation, the context data comprising at least one of client device data defining resource characteristics of the client device, user account data associated with a user of the client device requesting the emulation, and emulator system data defining characteristics of an emulator system providing the emulation, and at least one kind of external resource usable to provide the emulation of the computer product, the at least one kind of external resource comprising at least one kind of external hardware resource usable to provide the emulation of the computer product, the at least one kind of external hardware resource not being providable by the client device, the at least one kind of external hardware resource being providable by the emulator system;

determining a required class of service for providing the emulation based on the context data, the required class of service being one of a plurality of classes of service;

determining a plurality of possible resource instances, each possible resource instance in the plurality of possible resource instances being individually providable by the emulator system to provide the at least one kind of external hardware resource;

selecting at least one selected resource instance from the plurality of possible resource instances to provide an operating instance of the at least one kind of external hardware resource for the emulation based at least in part on the required class of service; and providing the emulation to the client device using the at least one selected resource instance.

\* \* \* \* \*